United States Patent [19]

Schuhmann et al.

[11] Patent Number: 5,326,625
[45] Date of Patent: Jul. 5, 1994

[54] SEALABLE, OPAQUE, BIAXIALLY ORIENTATED MULTILAYER POLYPROPYLENE FILM, PROCESS FOR ITS PRODUCTION AND ITS USE

[75] Inventors: Detlef E. Schuhmann, Kiedrich; Herbert Peiffer, Mainz-Finthen; Gunter Schloegl, Kelkheim, all of Fed. Rep. of Germany

[73] Assignee: Hoechst Aktiengesellschaft, Frankfurt am Main, Fed. Rep. of Germany

[21] Appl. No.: 887,827

[22] Filed: May 26, 1992

[30] Foreign Application Priority Data

May 28, 1991 [DE] Fed. Rep. of Germany ....... 4117442
Feb. 3, 1992 [DE] Fed. Rep. of Germany ....... 4202982

[51] Int. Cl.$^5$ .............................................. B32B 7/12
[52] U.S. Cl. ................................ 428/215; 428/349; 428/402; 428/330; 428/516; 428/910
[58] Field of Search .............. 428/349, 516, 204, 402, 428/330, 910, 215

[56] References Cited

U.S. PATENT DOCUMENTS

| 4,375,989 | 3/1983 | Mäkinen | 106/300 |
|---|---|---|---|
| 4,393,115 | 7/1983 | Yoshii et al. | 428/323 |
| 4,447,271 | 5/1984 | Howard et al. | 106/300 |
| 4,618,527 | 10/1986 | Doyen | 428/213 |
| 4,654,252 | 3/1987 | Doyen | 428/213 |
| 4,659,612 | 4/1987 | Balloni et al. | 428/213 |
| 4,698,261 | 10/1987 | Bothe et al. | 428/204 |
| 4,720,420 | 1/1988 | Crass et al. | 428/216 |
| 5,026,592 | 6/1991 | Janocha et al. | 428/204 |
| 5,028,480 | 7/1991 | Dean | 428/314.4 |
| 5,091,236 | 2/1992 | Keller et al. | 428/213 |

FOREIGN PATENT DOCUMENTS

| 236945 | 9/1987 | European Pat. Off. . |
|---|---|---|
| 263698 | 4/1988 | European Pat. Off. . |
| 408971 | 1/1991 | European Pat. Off. . |
| 477797 | 4/1992 | European Pat. Off. . |
| 2201407 | 9/1988 | United Kingdom . |

Primary Examiner—Edith Buffalow
Attorney, Agent, or Firm—Foley & Lardner

[57] ABSTRACT

A sealable, opaque, biaxially orientated multilayer polpropylene film comprising a core layer and (an) intermediate layer(s) located on one or both sides of the core layer and (a) top layer(s) located on one or both sides of the intermediate layer(s) or the core layer, wherein the core layer contains a polypropylene polymer or a polypropylene mixture and calcium carbonate having an average particle diameter of 1 to 2 $\mu$m; the intermediate layer(s) comprise(s) a polypropylene polymer or a polypropylene mixture; at least one top layer has a thickness of $\leq 0.4$ $\mu$m; and the top layer(s) comprise(s) a copolymer of ethylene and propylene or ethylene and butylene or propylene and butylene or ethylene and another $\alpha$-olefin having 5 to 10 carbon atoms or propylene and another $\alpha$-olefin having 5 to 10 carbon atoms or a terpolymer of ethylene and propylene and butylene or ethylene and propylene and another $\alpha$-olefin having 5 to 10 carbon atoms or a mixture of one or more of the co- and/or terpolymers mentioned with polypropylene or a mixture of two or more of the co- and/or terpolymers mentioned, has a combination of properties rendering it suitable as a packaging or wrapping film.

26 Claims, No Drawings

SEALABLE, OPAQUE, BIAXIALLY ORIENTATED MULTILAYER POLYPROPYLENE FILM, PROCESS FOR ITS PRODUCTION AND ITS USE

BACKGROUND OF THE INVENTION

1. Field of the Invention

The invention relates to a sealable, opaque, biaxially orientated multilayer polypropylene film comprising a core layer, an intermediate layer located on one side or both sides thereof and a top layer located on one or both sides of the intermediate layer or the core layer. The invention furthermore relates to a process for the production of the multilayer film and its use.

2. Description of Related Art

Opaque films are generally known. For example, a five-layer sealable film which has a vacuole-containing base layer produced from propylene homopolymer and calcium carbonate, and an intermediate layer of propylene homopolymer and hydrocarbon resin, and sealable top layers comprising propylene/ethylene copolymer, is described in EP-A-180, 087. Because of the thick intermediate layer of polypropylene and hydrocarbon resin, the film has better mechanical properties and a higher gloss than conventional films. In addition, the film is suitable for corona treatment because of the impressed-on sealing layers of propylene/ethylene copolymer. The film is in need of improvement in its gloss and whiteness or opacity. The non-optimum gloss results from the top layer having a customary thickness of 0.5 to 2 $\mu$m, and the low opacity values are due to the thick transparent intermediate layers. Only a low proportion of the thickness remains for the vacuole-containing core layer.

A multilayer opaque film in which one top layer consists of a readily printable polymer and which has an intermediate layer of propylene homopolymer and a vacuole-containing core layer is known from EP-A312,226. The film is said to be distinguished by a good gloss when viewed from the homopolymer side. Because of the stated layer thickness ratios, as in the case of EP-A-180,087, the surface gloss and the opacity or whiteness are in need of improvement.

A film of high whiteness and high opacity which can readily be printed and is said to be glossy is described in EP-A-408,971. Here also, the gloss is in need of improvement because of the high thickness of the top layer. On the other hand, the film may have a cloudy structure, which probably originates from the small particle size of the calcium carbonate used. The particle size of 1.0 $\mu$m, which is stated as preferred, results in a poor dispersibility in the polymer. In addition, the increased fine content of the grains leads to a reduced opacity, since this means that no vacuoles are formed.

Readily printable opaque films are described in EP-A-234,758 and in EP-A-225,685. However, because of the nature of the surface, the films are distinguished by a very matte appearance.

SUMMARY OF THE INVENTION

It is an object of the present invention to avoid the disadvantages of the films already described in the prior art. In particular, a multilayer film which is distinguished by a high whiteness and an outstanding opacity is to be provided. At the same time, the film is to have a good gloss and at least one top layer with good sealing properties, in particular with a large sealing region and a good sealed seam strength If appropriate, depending on its intended use, the film is additionally to have a printable surface and a high surface tension which is stable over long storage times and does not fall below 36 mN/m even after more than three months. It is furthermore a particular object of the invention to maximize the whiteness and opacity of the film at a given thickness and given surface gloss. From the point of view of the use of material, such a film represents the most favorable solution.

It is further an object of the invention to provide a multilayer film having outstanding gloss and good sealing properties.

It is furthermore an object of the present invention to provide a process of making such a film.

In accomplishing the foregoing objectives, there is provided, in accordance with one aspect of the present invention, a sealable, opaque, biaxially orientated multilayer polypropylene film comprising a core layer, an intermediate layer and a top layer, wherein said intermediate layer is located between said top layer and said core layer, wherein a) the core layer comprises a propylene polymer and calcium carbonate having an average particle diameter of 1 to 2 $\mu$m, b) the intermediate layer comprises a propylene polymer, and c) the top layer comprises
  a copolymer of
    ethylene and propylene,
    propylene and butylene,
    ethylene and an $\alpha$-olefin having 5 to 10 carbon atoms, or
    propylene and an $\alpha$-olefin having 5 to 10 carbon atoms, or
  a terpolymer of
    ethylene and propylene and butylene or
    ethylene and propylene and an $\alpha$-olefin having 5 to 10 carbon atoms or
  a mixture of one or more of the above copolymers and terpolymers with polypropylene, or
  a mixture of two or more of the co- and/or terpolymers mentioned, wherein the top layer has a thickness of $\leq 0.4$ $\mu$m.

In accordance with another aspect of the present invention there is provided a sealable, biaxially orientated, coextruded multilayer film which includes a sealable top layer, wherein the layer thickness of this sealable top layer is less than or equal to 0.4 $\mu$.

There is further provided a process for the production of the above-described multilayer films, wherein the melts corresponding to the individual layers of the multilayer film are coextruded through a flat die, the film thus obtained is cooled for solidification, the film is stretched biaxially and thermofixed and optionally one or both surfaces are treated by means of a corona or polarized flame, in which process at least one top layer applied by coextrusion is sealable and its layer thickness is less than or equal to 0.4 $\mu$m.

Further objects, features and advantages of the present invention will become apparent from the detailed description of preferred embodiments that follows.

DETAILED DESCRIPTION OF PREFERRED EMBODIMENTS

The film according to one aspect of the invention has at least three layers and comprises the core layer C and at least one intermediate layer I and at least one top layer T in accordance with a CIT build-up. The choice of the number of layers primarily depends on the proposed intended use, four- and five-layer embodiments being particularly preferred, corresponding to a symmetric build-up of TICIT or an asymmetric build-up of TCIT.

The total thickness of the film, and the thickness of the individual layers, can vary within wide limits depending on the proposed intended use.

In a preferred embodiment, the film has a total thickness of 10 to 120 μm, with 20 to 80 μm preferred, and with 30 to 60 μm being particularly preferred.

The thickness of the intermediate layer(s) is preferably, in each case independently of one another, 2 to 12 μm, with layer thicknesses of 3 to 8 μm, in particular 3 to 6 μm, being more particularly preferred. The values stated in each case relate to one intermediate layer.

At least one top layer of layer thickness of 0.4 μm or less is essential to the invention for the property profile. The range from 0.1 to 0.3 μm is preferred for this "thin" top layer. The thickness of the second top layer, if present, is chosen independently of the "thin" top layer and can in principle also be "thin", i.e. less than 0.4 μm, preferably from 0.1 to 0.3 μm, or it may be a thicker layer. Thicknesses of greater than 0.6 μm, in particular from 0.7 to 2 μm, are preferred for a second "thicker" layer.

The preferred thicknesses stated for the second top layer characterize particularly advantageous embodiments. However, the gap between 0.4 and 0.6 μm which results in the range of values is not thereby to be excluded from the invention.

The thickness of the core layer accordingly results from the difference between the total thickness and the thickness of the top and intermediate layer(s) applied and can therefore be varied, analogously to the total thickness, within wide limits.

Mixtures of polymers can e used in the layers, as long as the core and intermediate layers comprise a propylene polymer and the top layer comprises a polymer as indicated above. Mixtures in the sense of the present invention include both mechanical mixtures of the individual components and alloy-like mixtures, which are generally called blends.

The core layer of the multilayer film according to the invention comprises a propylene polymer or a mixture of propylene polymers and the calcium carbonate particles mentioned having an average particle diameter of between 1 and 2 μm, and if appropriate other additives in each case in effective amounts.

The propylene polymer of the core layer preferably comprises at least 50%, more preferably at least 90% propylene and preferably has a melting point of 140° C. or higher, more preferably of 150° to 170° C. Isotactic homopolypropylene having an n-heptane-soluble content of 6% by weight or less, based on the isotactic homopolypropylene, copolymers of ethylene and propylene having an ethylene content of 10% by weight or less, and copolymers of propylene with $C_4$—$C_8$—αolefins having an α-olefin content of 10% by weight or less are preferred propylene polymers for the core layer, isotactic homopolypropylene being particularly preferred. The stated percentages by weight relate to the particular copolymer. The propylene polymer of the core layer in general has a melt flow index of 0.5 g/10 minutes to 8 g/10 minutes, preferably 2 g/10 minutes to 5 g/10 minutes, at 230° C. and a force of 21.6 N (DIN 53 735).

A mixture of the propylene homo- and/or copolymers mentioned and/or other polyolefins, in particular having 2 to 6 carbon atoms, is furthermore suitable, the mixture preferably containing at least 50% by weight, in particular at least 75% by weight, of propylene polymer. Other suitable polyolefins in the polymer mixture include polyethylenes, in particular HDPE, LDPE and LLDPE, the content of these polyolefins in each case preferably not exceeding 15% by weight, based on the polymer mixture.

The polypropylene polymer of the core layer is optionally peroxidically degraded, as will be explained in detail below in the description of the intermediate layer.

In addition to the calcium carbonate mentioned, titanium dioxide is particularly suitable as a further core layer additive which can be added if appropriate. The titanium dioxide particles preferably consist mainly of rutile, which has a higher covering power compared with anatase. In a preferred embodiment, the titanium dioxide particles consist of rutile to the extent of at least 95% by weight. They can be prepared by a customary process, for example by the chloride or sulfate process. Titanium dioxide itself is known to be photoactive. Free radicals form on the surface of the $TiO_2$ particle under the action of UV rays. These free radicals can lead to degradation reactions and yellowing. The titanium dioxide particles are therefore preferably employed with a coating of inorganic oxides, such as is usually used as a coating for $TiO_2$ white pigment in paper or paints for improving light-fastness. Particularly suitable inorganic oxides include the oxides of aluminum, silicon, zinc or magnesium or mixtures of two or more of these compounds. The inorganic oxides are precipitated in aqueous suspension from water-soluble compounds, for example alkali metal aluminate, in particular sodium aluminate, aluminum hydroxide, aluminum sulfate, aluminum nitrate, sodium silicate or silicic acid. $TiO_2$ particles having a coating of several of these compounds are described, for example, in EP-A-78,633 and EP-A44,515.

The coating may furthermore comprise organic compounds having polar and non-polar groups. The organic compounds must be sufficiently stable during production of the film by extrusion of the polymer melt. Examples of polar groups are —OH, —OR and —COOX (X=R, H or Na; R=$C_1$-$C_{34}$-alkyl). Preferred organic compounds are alkanols and fatty acids having 8 to 30 carbon atoms in the alkyl group, in particular fatty acids and primary n-alkanols having 12 to 24 carbon atoms, as well as polydiorganosiloxanes and/or polyorganohydridosiloxanes, such as polydimethylsiloxane and polymethylhydridosiloxane.

The coating on the $TiO_2$, particles preferably consists of 1 to 12 g, in particular 2 to 6 g, of inorganic oxides and 0.5 to 3 g, in particular 0.7 to 1.5 g, of organic compound, based on 100 g of $TiO_2$ particles. The coating is applied to the particles in any known manner, such as in aqueous suspension. It has proven particularly advantageous for the $TiO_2$ particles to be coated with $Al_2O_3$ and stearic acid.

The content of titanium dioxide in the core layer, if present, is preferably 1 to 9% by weight, more preferably 1 to 5% by weight, based on the core layer. The average particle size is very small and is preferably 0.15 to 0.30 μm, the particle size stated relating to the coated particles.

With this weight content and particle size of titanium dioxide, the optical properties of the film (gloss, opacity and higher whiteness) are generally optimized.

Further improvements in the optical properties can be made according to the invention via the size and amount of the calcium carbonate particles in the core layer. Any desired amount of calcium carbonate may be added, with 2 to 7% by weight, particularly 3 to 5% by weight, based on the weight of the core layer, being preferred. According to the prior art, the average particle diameter of the $CaCO_3$ used is in the range from 0.7 to 5 $\mu$m, from 3 to 4 $\mu$m being a preferred range. However, in the present invention as discussed below, the $CaCO_3$ has an average particle size of 1 to 2 $\mu$m.

The choice of a suitable size for the average particle diameter in the case of the present invention was determined by several, in some cases opposing, factors.

As the particle diameter of the $CaCO_3$ increases, the vacuoles become larger and the desired opacity of the core layer is therefore improved, but the gloss of the film is reduced and at the same time the roughness of the surfaces of the core layer increases. As the particle size of the $CaCO_3$ increases, an increasingly thicker intermediate layer is thus necessary at the same time. At a given total thickness of the film, however, a thicker intermediate layer limits the thickness of the core layer, which determines the opacity. An upper limit is thus imposed on the maximization of the particle size for the best possible vacuole formation.

The lower limit of the $CaCO_3$ particle size is ordained by the dispersibility of the calcium carbonate particle and the ability to form vacuoles. In addition, the costs for the calcium carbonate masterbatch increase disproportionately if the particle diameter falls below a certain level.

When balanced consideration was given to all of these factors, an optimum average particle diameter of 1 to 2 $\mu$m was obtained.

An average particle diameter of the $CaCO_3$ within this stated range is essential for the requirement profile according to the invention of the multilayer film with an intermediate layer. The best results are achieved with a calcium carbonate particle size of about 1.5 $\mu$m for the average particle diameter.

In addition to these particularly advantageous additives, $TiO_2$ and $CaCO_3$, the core layer can of course also contain customary additives in the particular effective amounts, if appropriate, the addition of a low molecular weight resin being particularly preferred, as described below for the intermediate layer.

The addition of vacuole-forming $CaCO_3$ increases the roughness of the surfaces of the core layer and reduces the gloss of the film. To compensate these adverse effects, the core layer is provided with an intermediate layer on at least one side, and if appropriate on both sides, it being possible for intermediate layers on both sides to be identical or different in build-up (polymer), composition (additives) and thickness.

This/these intermediate layer(s) comprise(s) propylene polymers or mixtures of propylene polymers such as have been described above for the core layer. Any known propylene polymers can be used with those discussed above with reference to the core layer as preferred in the intermediate layer(s). The core layer and the intermediate layer(s) can in principle be built up from the same or different propylene polymers or mixtures.

The melt flow indices of the propylene polymers for the core and intermediate layer(s) should be as close as possible. If appropriate, the MFI of the intermediate layer(s) can be somewhat higher, but a difference of 20% should preferably not be exceeded.

In a particularly advantageous embodiment, the polypropylene polymers employed in the intermediate and/or core layer are partly degraded by the addition of organic peroxides. The so-called degradation factor A, which states the relative change in melt flow index according to DIN 53 735 of the polypropylene, based on the starting polymer, is a measure of the degree of degradation of the polymer.

$$A = \frac{MFI_2}{MFI_1}$$

$MFI_1$ = melt flow index before the addition of the organic peroxide to the polypropylene polymer $MFI_2$ = melt flow index of the peroxidically degraded polypropylene polymer According to the invention, the degradation factor A of the polypropylene polymer employed is preferably in a range from 3 to 15, more preferably from 6 to 10. It is particularly favorable to observe this range for the desired gloss properties of the film.

Particularly preferred organic peroxides are dialkyl peroxides, an alkyl radical being understood as saturated straight-chain or branched lower alkyl radicals having up to six carbon atoms. 2,5-Dimethyl-2,5-di(t-butylperoxy)hexane or di-t-butyl peroxide are particularly preferred.

Titanium dioxide is preferably included in the intermediate layer as additive. The $TiO_2$ can be selected from any of the types described above in connection with the core layer. A particularly suitable embodiment comprises $TiO_2$ in the intermediate layer which corresponds in respect to modification, coating, particle size and the like, to that described above for the core layer. The content of $TiO_2$ in the intermediate layer is preferably less than 5% by weight and more preferably between 1 and 5% by weight, based on the weight of the intermediate layer. Overall, the content of $TiO_2$ in the core and intermediate layer(s) should not exceed 5% by weight, based on the total weight of the core and intermediate layers.

The addition of a low molecular weight resin in the core layer and/or the intermediate layer is furthermore preferred. The content of this resin is generally 1 to 30% by weight, preferably 2 to 10% by weight, based on the weight of the intermediate layer. The softening point of the resin is preferably between 130° and 180° C. (measured in accordance with DIN 1995-U4, which corresponds to ASTM E-28), more preferably above 140° C. They preferably have a number average molecular weight of 200 to 2,000. Among the numerous low molecular weight resins, the hydrocarbon resins are preferred, and the petroleum resins, styrene resins, cyclopentadiene resins and terpene resins are particularly preferred. These resins are described in Ullmanns Encyklopidie der techn. Chemie (Ullmann's Encyclopedia of Industrial Chemistry), 4th edition, Volume 12, pages 525 to 555.

The petroleum resins are those hydrocarbon resins which are prepared by polymerization of deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The styrene resins are low molecular weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials comprising cyclopentadiene at a high temperature for a long time. Dimers, trimers or oligomers can be obtained, depending on the reaction temperature.

The terpene resins are polymers of terpenes, that is to say hydrocarbons of the formula $C_{10}H_{16}$, which are present in virtually all essential oils or oil-containing resins of plants, and phenol-modified terpene resins. Pinene, α-pinene, dipentene, limonene, myrcene, camphene and similar terpenes may be mentioned as specific examples. The hydrocarbon resins can also be the so-called modified hydrocarbon resins. The modification is in general carried out by reaction of the raw materials before the polymerization, by introduction of specific monomers or by reaction of the polymerized product, hydrogenations or partial hydrogenations being carried out in particular.

Styrene homopolymers, styrene copolymers, cyclopentadiene homopolymers, cyclopentadiene copolymers and/or terpene polymers having a softening point of in each case above 135° C. are furthermore employed as hydrocarbon resins (in the case of the unsaturated polymers, the hydrogenated product is preferred). The cyclopentadiene polymers having a softening point of 140° C. or more are especially preferably employed in the intermediate layers.

The intermediate layer can also additionally contain other customary additives in addition to the preferred hydrocarbon resin and titanium dioxide additives.

The top layer(s) located on the outer surface(s) of the intermediate layer(s) or of the core layer comprise(s)
a copolymer of
ethylene and propylene or
ethylene and butylene or
propylene and butylene or
ethylene and another α-olefin having 5 to 10 carbon atoms or
propylene and another α-olefin having 5 to 10 carbon atoms or
a terpolymer of
ethylene and propylene and butylene or
ethylene and propylene and another α-olefin having 5 to 10 carbon atoms or
a mixture of one or more of the co- and/or ter- polymers mentioned with polypropylene or
a mixture of two or more of the co- and/or ter- polymers mentioned
and, if appropriate, other additives.

The top layer(s) particularly preferably comprise(s), in addition to the optional additives,
a copolymer of
ethylene and propylene or
ethylene and 1-butylene or
propylene and 1-butylene or
a terpolymer of
ethylene and propylene and 1-butylene or
a mixture of one or more of the particularly preferred co- and/or terpolymers mentioned with polypropylene or
a mixture of two or more of the particularly preferred co- and/or terpolymers mentioned,
particularly preferred constituents being
random ethylene/propylene copolymers having
an ethylene content of 2 to 10% by weight, preferably 5 to 8% by weight, or
random propylene/1-butylene copolymers having
a butylene content of 4 to 25% by weight, preferably 10 to 20% by weight,
in each case based on the total weight of the copolymer, or
random ethylene/propylene/1-butylene terpolymers having
an ethylene content of 1 to 10% by weight, preferably 2 to 6% by weight, and
a 1-butylene content of 3 to 20% by weight, preferably 8 to 10% by weight,
based on the total weight of the terpolymer, or a mixture of an ethylene/propylene/1-butylene terpolymer and a propylene/1-butylene copolymer
having an ethylene content of 0.1 to 7% by weight and a propylene content of 50 to 90% by weight and a 1-butylene content of 10 to 40% by weight,
based on the total weight of the polymer mixture.

The polymer(s) of the top layer(s) is/are optionally also peroxidically degraded, as described above for the intermediate layer and the core layer.

Like the intermediate layer, the top layer can be applied to one or both sides of the film. Top layers applied to both sides can be identical or different in build-up, composition and thickness. The choice of suitable polymers, additives and thickness is made for each top layer independently of the other layer and with regard to the desired properties and the particular intended use of the film. However, it is essential to the invention for the required property profile that at least one top layer of the multilayer film is no thicker than 0.4 μm, the range from 0.1 to 0.3 μm being particularly preferred.

Conventionally, sealable polymers, in particular polypropylene, are applied in layer thicknesses of significantly more than 0.5 μm, which means that the good surface gloss of the intermediate layer is considerably reduced. The loss in gloss is substantial, and in some cases is more than 30 to 40 units. Surprisingly, the outstanding gloss of the intermediate layer is retained if the top layer is no thicker than 0.4 μm. At the same time, such a top layer completely unexpectedly still has very good sealing values, in spite of its thinness. In the context of further studies, it has been found that this invention can also be applied to other types of film, and not only high-gloss, opaque film types can be provided with the extremely thin top layer according to the invention. It has been found that the most diverse sealable top layers can also be reduced in layer thickness to a range of α0.4 μm in the case of transparent or matt or other types of film. Accordingly, in another aspect of the invention, there is provided a sealable, biaxially oriented, coextruded multilayer film which has the inventive sealing layer. Any multilayer film is within the scope of this aspect of the invention, so long as the inventive sealable layer is present as a layer on the film.

In a preferred embodiment of the multilayer film, different top layers are applied to both sides, the invention also including variants having only one top layer or having identical top layers on both sides.

The term "different" used in discussion of the top and intermediate layers relates both to the thickness of the top and intermediate layers and to the polymer from which they are built up, and also to the composition thereof in respect to the nature and amount of additives added. However, all the parameters here do not necessarily have to be different. Top layers and/or intermediate layers are also "different" in the sense of the preferred embodiment if only one of the properties mentioned differs.

It is particularly preferable for both top layers to be of different thicknesses, the "thinner" top layer (T1) comprising not more than 0.4 $\mu$m, preferably 0.1 to 0.3 $\mu$m, and the "thicker" top layer (T2) comprising at least 0.6 $\mu$m, preferably 0.7 to 2 $\mu$m.

Of the polymers described above for the top layer, ethylene/propylene copolymers, ethylene/propylene/butylene terpolymers and mixtures of propylene/butylene copolymers and ethylene/propylene/butylene terpolymers are especially suitable. With two top layers which can be differentiated by their thickness, this results in six possible combinations, all of which have proven to be particularly advantageous.

The top layer(s) may also be degraded in the same manner as the intermediate layers with a preferred degradation factor being 3 to 15.

The additives, if appropriate, to the top layers include, in particular, silicon dioxide as an antiblocking agent and polydimethylsiloxane (PDSS) as a lubricant. These are preferably added to the "thicker" top layer T2. Silicon dioxide is particularly advantageously employed with an average particle diameter of 1 to 6 $\mu$m and in an amount of 0.1 to 2% by weight. PDMS is particularly favorable with a viscosity of 10,000 to 1,000,000 mm$^2$/s and in an amount of 0.3 to 2% by weight (in each case based on the weight of the layer).

It is furthermore preferable to add no SiO$_2$ and no PDMS to the "thinner" top layer T1, although it may comprise other customary additives in the particular effective amounts, if appropriate.

To improve the adhesion properties of the top layer(s), the surfaces of the film can be subjected to corona or flame treatment, in which case the corresponding treatment of one surface may be sufficient. In particular, it is preferable for the thin top layer, T1, to be subjected to corona or flame treatment.

To improve certain properties of the polypropylene film according to the invention still further, additives, preferably antistatics and/or antiblocking agents and/or lubricants and/or stabilizers and/or neutralizing agents which are compatible with the polymers of the core layer and the top layer(s), can be added in each case in an effective amount to one or more of the core layer, intermediate layer(s), and top layer(s). Other known additives can also be used. All the amounts stated in percent by weight (% wt.) in the following explanation in each case relate to the layer or layers to which the additive can be added.

Any known antistatic agent can be used. Preferred antistatic agents include alkali metal alkanesulfonates, polyether-modified, i.e., ethoxylated and/or propoxylated, polydiorganosiloxanes (polydialkylsiloxanes, polyalkylphenylsiloxanes and the like) and/or the essentially straight-chain and saturated aliphatic tertiary amines having an aliphatic radical with 10 to 20 carbon atoms, which are substituted by $\omega$-hydroxy-($C_1$-$C_4$)-alkyl groups, preferred amines being N,N-bis-(2-hydroxyethyl)-alkylamines having 10 to 20 carbon atoms, preferably 12 to 18 carbon atoms, in the alkyl radical. The effective amount of antistatic is preferably in the range from 0.05 to 0.3% wt.

Any known lubricant can be used. Preferred lubricants include higher aliphatic acid amides, higher aliphatic acid esters, waxes and metal soaps as well as polydimethylsiloxanes. The effective amount of lubricant is generally in the range from 0.1 to 3% wt. The addition of higher aliphatic acid amides in the range from 0.15 to 0.25% wt. in the base layer and/or the top layers is particularly suitable. Erucic acid amide is a particularly suitable aliphatic acid amide. Addition of polydimethylsiloxanes in the range from 0.3 to 2.0% wt., especially polydimethylsiloxanes having a viscosity of 10,000 to 1,000,000 mm$^2$/s, is also preferred.

The customary compounds which have a stabilizing action on ethylene polymers, propylene polymers and other $\alpha$-olefin polymers can be employed as stabilizers. The amount thereof added is preferably between 0.05 and 2% wt. Phenolic stabilizers, alkali metal/alkaline earth metal stearates and/or alkali metal/alkaline earth metal carbonates are particularly suitable. Phenolic stabilizers in an amount of 0.1 to 0.6% wt., in particular 0.15 to 0.3% wt., and having a molecular weight of more than 500 g/mol are preferred. Pentaeryth-rityltetrakis-3-(3,5-di-tert-butyl-4-hydroxyphenyl)propionate or 1,3,5-trimethyl-2,4,6-tris(3,5-di-tert-butyl4-hydroxybenzyl)benzene are particularly advantageous.

Any known antiblocking agent can be added. Suitable antiblocking agents include inorganic additives, such as silicon dioxide, calcium carbonate, magnesium silicate, aluminum silicate, calcium phosphate, and the like; organic polymers incompatible with the polymer in the layer, such as polyamides, polyesters, polycarbonates, and the like, with benzoguanamine-formaldehyde polymers, silicon dioxide and calcium carbonate being preferred. The effective amount of antiblocking agent is generally in the range from 0.1 to 2% wt., preferably 0.1 to 0.5% wt. The average particle size of the agent is preferably between 1 and 6 $\mu$m, in particular between 2 and 5 $\mu$m, particles having a spherical shape, such as are described in EP-A-0,236,945 and DE-A-38 01 535, being particularly suitable.

Neutralizing agents include all those known and are, preferably, calcium stearate and/or calcium carbonate having an average particle size of not more than 0.7 $\mu$m, an absolute particle size of less than 10 $\mu$m and a specific surface area of at least 40 M$^2$/g.

Any known process can be used to produce the film described above. The coextrusion process which is known per se is a preferred method. In the context of this process, a procedure is followed in which the melts corresponding to the individual layers of the film are coextruded through a flat die, the film thus obtained is taken off on one or more roll(s) for solidification, the film is then stretched (orientated) biaxially, the biaxially stretched film is thermofixed and if appropriate, the surface layer intended for corona treatment is subjected to corona treatment. The biaxial stretching (orientation) can be carried out simultaneously or in succession, successive biaxial stretching, in which the film is stretched first longitudinally (in the direction of the machine) and then transversely (perpendicular to the direction of the machine), being preferred.

As is customary in the coextrusion process, the polymer or the polymer mixture of the individual layers is first compressed and liquefied in an extruder, it being possible for the polymer already to contain the additives if appropriate. The melts are then forced simultaneously through a flat die (slot die) and the extruded multilayer film is taken off on one or more take-off rolls, where it cools and solidifies.

The film thus obtained is then stretched longitudinally and transversely to the extrusion direction, which leads to orientation of the molecular chains. The stretching is preferably 4:1 to 7:1 in the longitudinal direction and preferably 6:1 to 9:1 in the transverse direction. The longitudinal stretching is advantageously carried out with the aid of two rolls running at different speeds according to the required stretching ratio, and the transverse stretching is carried out with the aid of an appropriate tenter frame.

The biaxial stretching of the film is preferably followed by its thermofixing (heat treatment), the film being kept at a temperature of 110° to 130° C. for about 0.5 to 10 seconds. The film is then wound up in the customary manner using a wind-up device.

It has proven to be particularly favorable for the take-off roll or rolls by which the extruded film is also cooled and solidified to be kept at a temperature of 10° to 90° C., preferably 20 °to 60° C.

The longitudinal stretching is moreover advantageously carried out at a temperature of less than 140° C., preferably in the range from 110° to 130° C., and the transverse stretching is advantageously carried out at a temperature above 140° C., preferably at 145° to 160° C.

If appropriate, as mentioned above, after the biaxial stretching one or both outside surfaces of the film can be subjected to corona or flame treatment by one of the known methods. A procedure is advantageously followed here in which the film is passed between two conductor elements which serve as electrodes, with a high voltage, usually an alternating voltage (about 10,000 V and 10,000 Hz) being applied between the electrodes such that spray or corona discharges can take place. The spray or corona discharge ionizes the air above the film surface, which reacts with the molecules of the film surface so that polar incorporations are formed in the essentially non-polar polymer matrix. The treatment intensities are within the usual limits, 38 to 45 mN/m being preferred.

The multilayer film according to the invention has a combination of properties which render it particularly suitable to a high degree for its specified intended use as packaging film or wrapping film for high-speed wrapping machines. In fact, it has all of the properties required of polypropylene films in respect to a close, fold- and corrugation-free, promotionally effective wrapping image. The multilayer film according to the invention is moreover also suitable, especially after corona or flame treatment, for the production of metallized and printed films.

In summary, it may be said that the multilayer film according to the invention is distinguished by a large number of advantageous properties, in particular by
  very high gloss,
  a high opacity and a high whiteness,
  a visually homogeneous film,
  good sealing properties on one or both sides,
  surfaces which are easy to treat,
  good immediate and long-term printability,
  if a hydrocarbon resin is present in the intermediate layer: improved barrier properties in respect of passage of water vapor,
  a high scratch resistance of both surface layers,
  good coating and further-processing properties.

The invention is illustrated in more detail by the following examples:

EXAMPLE 1

A five-layer symmetric film (build-up of the layers: TICIT) was produced, and the following production parameters were observed:

|  | Extrusion temperature | Material output rate |
| --- | --- | --- |
| Core layer C | 280° C. | 2,400 kg/hour |
| Intermediate layers I | 280° C. | 600 kg/hour (total) |
| Top layers T | 260° C. | 32 kg/hour (total) |

The core layer and the two intermediate layers were brought together via a laminar adapter (ICI film), since they have about the same viscosity. The two top layers were then applied to the ICI film by means of a three-layer die. This preliminary film was cooled on a cooling roll (temperature of the cooling roll: 30° C.). It was then stretched first in the longitudinal direction ($\lambda=5.51$; T=130° C.) and then in the transverse direction $\lambda=9:1$ T=160° C., convergence: 15%). The machine speed was about 210 m/minute.

The film had the following build-up:

| Core layer C: | |
| --- | --- |
| 90.85% wt. | of propylene homopolymer having a melt flow index of 4 g/10 minutes (230° C., 21.6 N) |
| 5% wt. | of titanium dioxide (rutile) having an average particle diameter of 0.2 μm and a coating of Al$_2$O$_3$ and stearic acid |
| 4% wt. | of calcium carbonate having an average particle diameter of 1.5 μm |
| 0.15% wt. | of N,N-bis-ethoxyalkylamine (antistatic; Armostat ® 300, AKZO, Düren, DE) |

The titanium dioxide was introduced via a masterbatch (45% wt. of PP, 55% wt. of TiO$_2$; Schulman white 8555 P, Schulman, Kerpen, Del.), as was the calcium carbonate (masterbatch of 30% wt. of PP, 70% wt. of CaCO$_3$; Multibase ® 7012 T, OMYA, Cologne, Del.).

| Intermediate layers I: | |
| --- | --- |
| 100% wt. | of propylene homopolymer having a melt flow index of 5 g/10 minutes (230° C., 21.6 N) |
| Top layers T: | |
| 100% wt. | of peroxidically degraded ethylene/propylene copolymer having a C$_2$ content of 4%, a melt flow index of 12 g/10 minutes (230° C., 21.6 N) and a degradation factor of 8 |
| Thickness of the film: | 40 μm |
| Thickness of layer C: | 32.6 μm |
| Thickness of the intermediate layers I: | in each case 3.5 μm |
| Thickness of the top layers T: | in each case 0.2 μm |

One top layer (T side) was subjected to corona treatment at 41 mN/m. The film had the properties according to the invention shown in Table 1.

EXAMPLE 2

A four-layer asymmetric film having the following build-up was produced according to Example 1:

| | |
|---|---|
| Core layer C: | as in Example 1 |
| Intermediate layer I: | as in Example 1 |
| Top layer T1: | as in Example 1 |
| Top layer T2: | C2C3 copolymer (ELTEX ® PKS 419 × 6672; Solvay, Solingen, DE) |

The film thickness is again 40 μm. The thickness of the core layer is 35.6 μm. The thickness of the intermediate layer is 3.5 μm. The thickness of top layer T2 is 0.7 μm; this layer is sealable. The thickness of top layer T1 is again 0.2 μm. Surprisingly, this is also sealable. The T1 side was again subjected to corona treatment at 41 mN/m.

EXAMPLE 3

A five-layer film having the following symmetric build-up was produced according to Example 1:

| | |
|---|---|
| Core layer C: | as in Example 1 |
| Intermediate layers I: | as in Example 1, but additionally with 3% of titanium dioxide (coated as in Example 1) |
| Top layers T: | as in Example 1 |

EXAMPLE 4

A five-layer film having the following symmetric build-up was produced according to Example 1:

| | |
|---|---|
| Core layer C: | as in Example 1 |
| Intermediate layers I: | as in Example 3, but additionally with 10% of hydrocarbon resin (Escorez ® ECR 356, Exxon, Cologne, DE) |
| Top layers T: | as in Example 1 |

EXAMPLE 5

A four-layer asymmetric (layer build-up T2CIT1) film having the following build-up was produced according to Example 2:

| | |
|---|---|
| Core layer C: | as in Example 1 |
| Intermediate layer I: | as in Example 1 |
| Top layer T1: | as in Example 1 |
| Top layer T2: | low-sealing polymer blend (Tafmer ®; Mitsui Petrochemical, Tokyo, JP) |

The film thickness is again 40 μm. The thickness of the core layer is 35.6 μm. The thickness of the intermediate layer is 3.5 μm. The thickness of top layer T2 is 0.7 μm; the layer is sealable. The thickness of top layer T1 is again 0.2 μm, and as mentioned in Example 2, is also surprisingly sealable. The T1 side was again subjected to corona treatment at 41 mN/m. A minimum sealing kick-off temperature of 80° C. was measured. To determine this parameter, a strip 15 mm wide was sealed at various temperatures for 0.5 second at 10 N/cm². The minimum sealing kick-off temperature is reached when a sealing force of 0.5 N/mm is reached when the sealed seam is pulled apart (at 20 cm/minute).

Comparison Example 1

A film was produced as in Example 1, but the calcium carbonate had a particle size of 3.0 μm. Table 1 shows that the gloss of the film decreased significantly. The opacity and whiteness also decreased.

Comparison Example 2

A film was produced as in Example 1, but the calcium carbonate had a particle size of 0.8 μm. The film was cloudy and the opacity was significantly lower. In addition, the calcium carbonate chosen was very expensive.

Comparison Example 3

A film was produced as in Example I, but the top layers do not comprise a peroxidically degraded copolymer. The gloss of the film decreased noticeably.

Comparison Example 4

A film was produced as in Example 1, but the layer thickness of the top layers was 0.6 μm. The gloss of the film decreased noticeably.

Comparison Example 5

A film was produced as in Example 1, but without top layers. The film had a high gloss but was not stable to corona treatment.

The following measurement methods were used to characterize the raw materials and the films:

Melt Flow Index (MFI) DIN 53 735 under a load of 21.6 N at 230° C.

Melting Point

DSC measurement, maximum of the melting point curve, with heating-up rate of 20° C./minute.

Gloss

The gloss was determined in accordance with DIN 67 530. The reflector value was measured as an optical parameter of the surface of a film. In accordance with the standards ASTM-D 523-78 and ISO 2813, the incident angle was set at 60° or 20°. A ray of light impinges on the flat test surface under the incident angle set and is reflected or scattered by this. The rays of light falling on the photoelectronic receiver are displayed as a proportional electrical parameter. The measurement value is dimensionless and must be stated together with the incident angle.

Surface Tension

The surface tension was determined by means of the so-called ink method (DIN 53 364).

Printability

The corona-treated films were printed 14 days after their production (short-term evaluation) and 6 months after their production (long-term evaluation). The adhesion of the print was evaluated by means of the adhesive tape test. If no print could be removed by means of adhesive tape, the print adhesion was evaluated as reasonable, and if significant print was removed it was evaluated as poor.

Opacity and Whiteness

The opacity and whiteness are determined with the aid of the "ELREPHO" electrical reflectance photometer from Zeiss, Oberkochem (Del.), standard illuminant C, 2° standard observer. The opacity is determined in accordance with DIN 53 146. The whiteness is defined as W =RY +3RZ 3RX. Where W whiteness; RY, RZ and RX corresponding reflection factors using the Y, Z and X color-measuring filter. A pellet of barium sulfate (DIN 5033, part 9) is used as the white standard. A film sample (size DIN A4) is irradiated for several days in a device of the Suntest CPS type from Heraeus, Hanau (Del.), with an irradiation intensity of 765 W/m², and then compared with a nonirradiated sample with the naked eye.

Sealed Seam Strength

For this determination two strips of film 15 mm wide were placed on top of one another and sealed at 130° C. for a sealing time of 0.5 second under a sealing pressure of 10N/cm² (apparatus: Brugger type NDS, sealing jaw heated on one side). The sealed seam strength was determined by the T peel method.

TABLE 1

| Film Properties | Opacity | Whiteness | Gloss 20° T1/T2 | Surface tension after 6 months | Sealed seam strength of the top layer $\leq 0.4$ μm |
|---|---|---|---|---|---|
| Example 1 | 85 | 85 | 60/60 | >38 | 1.8 |
| Example 2 | 85 | 85 | 60/9 | " | 1.8 |
| Example 3 | 86 | 90 | 60/60 | " | 2.0 |
| Example 4 | 86 | 90 | 63/63 | " | 1.9 |
| Example 5 | 85 | 85 | 60/10 | " | 2.1 |
| Comparison Example 1 | 80 | 80 | 35/35 | " | |
| Comparison Example 2 | 70 | 80 | 62/62 | " | |
| Comparison Example 3 | 85 | 85 | 48/48 | " | |
| Comparison Example 4 | 85 | 85 | 45/45 | " | |
| Comparison Example 5 | 85 | 85 | 70/70 | <34 | |

What is claimed is:

1. A sealable, opaque, biaxially orientated multilayer polypropylene film comprising a core layer, an intermediate layer and a sealable top layer, wherein said intermediate layer is located between said core layer and said top layer, wherein
   a) the core layer comprises a propylene polymer and calcium carbonate having an average particle diameter of 1 to 2 μm,
   b) the intermediate layer comprises a propylene polymer, and
   c) the top layer comprises
      a copolymer of
         ethylene and propylene,
         ethylene and butylene,
         propylene and butylene,
         ethylene and an α-olefin having 5 to 10 carbon atoms, or
         propylene and an α-olefin having 5 to 10 carbon atoms, or
      a terpolymer of
         ethylene and propylene and butylene, or
         ethylene and propylene and an α-olefin having 5 to 10 carbon atoms, or
      a mixture of one or more of the above copolymers and terpolymers with polypropylene or
      a mixture of two or more of said copolymers, said terpolymers, or both of said copolymers and said terpolymers,
   wherein the top layer has a thickness of $\leq 0.4$ μm, and wherein the top layer does not comprise either polydimethylsiloxane or silicon dioxide.

2. A multilayer polypropylene film as claimed in claim 1, which consists of three layers wherein said intermediate layer is adjacent to said core and top layers.

3. A multilayer polypropylene film as claimed in claim 1, which comprises an additional top layer which may be the same or different from the other top layer, wherein the additional top layer is adjacent to the side of said core layer not adjacent to said intermediate layer, wherein only one of said top layers must be sealable and have a thickness of $\leq 0.4$ mm, and not comprise either polydimethylsiloxane or silicone dioxide.

4. A multilayer polypropylene film as claimed in claim 1, wherein the film contains five layers, comprising two of said top layers, which may be the same or different, and two of said intermediate layers, which may be the same of different, arranged such that said core layer is located between said intermediate layers, and said intermediate layers are located between said core and top layers, wherein only one of said top layers must be sealable and have thickness of $\leq 0.4$ mm, and not comprise either polydimethylsiloxane or silicone dioxide.

5. A multilayer polypropylene film as claimed in claim 1, wherein the core layer comprises titanium dioxide, which may optionally be coated with at least one of an inorganic oxide and an organic compound having polar and non-polar groups.

6. A multilayer polypropylene film as claimed in claim 5, wherein the content of titanium dioxide in the core layer is between 1 and 5% by weight, based on the weight of the core layer, and the average particle diameter of the TiO₂ particles is 0.15 to 0.30 μm.

7. A multilayer polypropylene film as claimed in claim 1, wherein the CaCO₃ content in the core layer is 2 to 7% by weight based on the weight of the core layer.

8. A multilayer polypropylene film as claimed in claim 1, wherein the intermediate layer comprises a hydrocarbon resin and optionally titanium dioxide.

9. A multilayer polypropylene film as claimed in claim 8, wherein the hydrocarbon resin content in the intermediate layer is 1 to 30% by weight, based on the weight of the intermediate layer.

10. A multilayer polypropylene film as claimed in claim 1, wherein the propylene polymer of the intermediate layer is peroxidically degraded.

11. A multilayer polypropylene film as claimed in claim 10, wherein the degradation factor of the propylene polymer used in the intermediate layer is 3 to 15.

12. A multilayer polypropylene film as claimed in claim 1, wherein the thickness of the intermediate layer is 2 to 6 μm.

13. A multilayer polypropylene film as claimed in claim 1, wherein the top layer comprises
   a copolymer of ethylene and propylene or
ethylene and 1-butylene or
propylene and 1-butylene or
a terpolymer of
ethylene and propylene and 1-butylene or
a mixture of one or more of the co- and/or ter-polymers mentioned above with polypropylene or
a mixture of two or more of the co- and/or terpolymers mentioned above.

14. A multilayer polypropylene film as claimed in claim 13, wherein the top layer comprises a
random ethylene/propylene copolymer having an ethylene content of 2 to 10% by weight or
random propylene/1-butylene copolymer having a 1-butylene content of 4 to 25% by weight, in each case based on the total Weight Of the copolymer, or a
random ethylene/propylene/1-butylene terpolymer having
an ethylene content of 1 to 10% by weight, and
a 1-butylene content of 3 to 20% by weight, based on the total weight of the terpolymer, or a mixture of an ethylene/propylene/1-butylene terpolymer and a propylene/ 1-butylene copolymer having an ethylene content of 0.1 to 7% by weight and a propylene content of 50 to 90% by weight and a 1-butylene content of 10 to 40% by weight, based on the total weight of the polymer mixture.

15. A multilayer polypropylene film as claimed in claim 1, wherein the top layer comprises a polymer which is peroxidically degraded.

16. A multilayer polypropylene film as claimed in claim 15, wherein the top layer comprises a polymer having a degradation factor of 3 to 15.

17. A multilayer polypropylene film as claimed in claim 1, wherein the thickness of the top layer is 0.1 to 0.3 μm.

18. A multilayer polypropylene film as claimed in claim 3, wherein the thickness of one top layer is ≦0.4 μm and the thickness of the other top layer is >0.6 μm.

19. A multilayer polypropylene film as claimed in claim 4, wherein the thickness of one top layer is ≦0.4 μm and the thickness of the other top layer is >0.6 μm.

20. A multilayer polypropylene film as claimed in claim 18, wherein the top layer of thickness >0.6 μm comprises polydimethylsiloxane and silicon dioxide.

21. A multilayer polypropylene film as claimed in claim 1, wherein at least one layer comprise at least one additive selected from the group consisting of antistatic agents, antiblocking agents, lubricants, stabilizers, and neturalizing agents.

22. A packaging film comprising a multilayer polypropylene film as claimed in claim 1.

23. A film as claimed in claim 1 which has been metallized or printed.

24. A multilayer polypropylene film as claimed in claim 1, wherein the total thickness of the film is 10 to 120 micrometers.

25. A multilayer polypropylene film as claimed in claim 1, wherein the propylene polymer of the core layer and the intermediate layer may be the same or different and both propylene polymers contain at least 90% by weight of propylene.

26. A multilayer polypropylene film as claimed in claim 1, wherein the core layer consists essentially of said propylene polymer and calcium carbonate, wherein the intermediate layer consists essentially of said propylene polymer, and wherein said top layer consists essentially of said copolymer, terpolymers, or mixtures.

* * * * *